Figure 1:
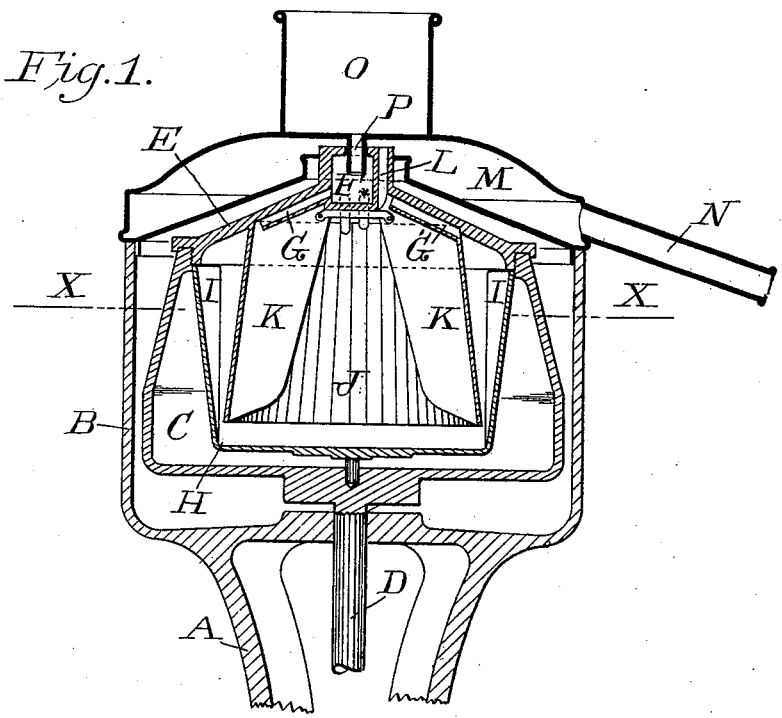

No. 607,109. Patented July 12, 1898.
J. L. BERGH.
PROCESS OF AND APPARATUS FOR CLARIFYING MILK.
(Application filed June 3, 1897.)
(No Model.)

Witnesses:
J. W. Fisher
E. Luddecke

Inventor,
Jefferson L. Bergh.
by William H. Low,
Attorney.

UNITED STATES PATENT OFFICE.

JEFFERSON L. BERGH, OF COBLESKILL, NEW YORK, ASSIGNOR OF TWO-THIRDS TO GEORGE H. THACHER AND LEWIS BALCH, OF ALBANY, NEW YORK.

PROCESS OF AND APPARATUS FOR CLARIFYING MILK.

SPECIFICATION forming part of Letters Patent No. 607,109, dated July 12, 1898.

Application filed June 3, 1897. Serial No. 639,224. (No model.)

*To all whom it may concern:*

Be it known that I, JEFFERSON L. BERGH, of Cobleskill, in the county of Schoharie and State of New York, have discovered and invented a new and useful Process of and Apparatus for Clarifying Milk, of which the following is a full and exact description.

My discovery and invention relate to a new and improved process of clarifying milk without separating the cream from the other constituent elements of pure milk and without altering the chemical composition of the same; and it consists in subjecting the cream-containing milk to a moderate degree of agitation, preferably in a centrifugal apparatus which is rotated at a comparatively low rate of speed and which is provided with a single outlet for the discharge of the commingled milk and cream, whereby the constituent elements of the milk will first be separated from each other and then chemically and thoroughly commingled again, and the tangible impurities that may be held in suspension in the milk will be thrown by the centrifugal force generated by the motion of the apparatus and lodged on the walls of the latter, whereon they will be retained until dislodged therefrom in the operation of cleansing the apparatus, and the clarified milk, which will retain the cream thoroughly commingled therewith, will escape from the apparatus through an outlet provided for that purpose; and my invention also consists of an apparatus, preferably as shown and described herein, that will effect a perfect commingling of all the constituent elements of pure milk, but which will not effect a separation of said elements from each other, and whereby the milk will be brought to a condition in which an ordinary change of temperature will not cause the cream to rise to the surface of the milk in the usual manner.

Heretofore centrifugal machines provided with separate and independent outlets for the cream and skim-milk and which have been rotated at an exceedingly-high rate of speed have been used for the purpose of effecting a separation of the cream from the milk; but such a mode of operation would defeat the purpose for which my apparatus is intended.

Figure 2:
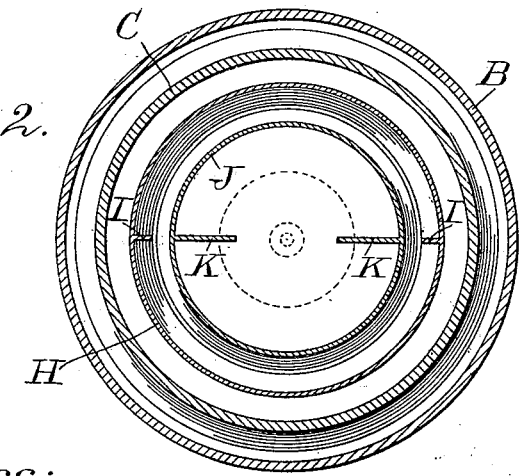

In the accompanying drawings, which are herein referred to and form part of this specification, Figure 1 is a vertical section of the upper portion of my apparatus, and Fig. 2 a horizontal section of the same at the line X X.

As represented in the drawings, A designates a standard or frame for my apparatus and on which a cylindrical vessel B is surmounted, said vessel being open at the top and closed at the bottom, said vessel being formed on or secured to the top of the standard A in such manner that it will remain in a stationary position thereon.

C is an outer bowl that is arranged to revolve in the vessel B and is secured to the upper end of a vertical shaft D, that is fitted to revolve in bearings in the frame A. Said shaft is driven by belts and pulleys or other suitable means, which are well known, but are not shown in the drawings, to obtain a moderate rate of speed. The bowl C is provided with a bonnet E, which is secured to and forms a closure for the upper end of said outer bowl. Preferably the bonnet E is made to screw into the upper end of the bowl C. Said bonnet is provided with a receptacle F, into which the milk is delivered, and from said receptacle the milk is conveyed, through ducts G, into an intermediate bowl H, which is contained in and revolves with the outer bowl C, but is removable from the latter. Said intermediate bowl is provided with radial wings I, of which only two are shown in the drawings; but a greater number may be used, if preferred.

The intermediate bowl H should be removable from the bowl C in order to afford suitable facilities to effect a thorough cleansing of the interior of the latter and to afford access to every part of the intermediate bowl for the purpose of removing therefrom all the impurities from the milk that may become lodged on or in any part of the last-named bowl. The latter flares outwardly, but the inner edges of the wings I are vertical and parallel with each other. An inverted inner bowl J, whose largest diameter is at the lower end, is secured to the bonnet E and is provided with inwardly-extending radial wings K, which are arranged to leave an open space between them, and a duct L' leads from the upper end of said space to the outer end of the bonnet E. The purpose of said duct is to conduct the cream and milk, which have been thoroughly commingled, out of the bowl H.

M is a receiver for the commingled milk and cream that is discharged from the duct L. Said receiver is fitted to rest upon the top of the vessel B and is removable from the latter; but while in place on the apparatus it remains in a stationary position. Its bottom is provided with a central opening, which fits snugly on the perimeter of the receptacle F, so that the commingled milk and cream flowing out of the duct L cannot return into the apparatus. The bottom of said receiver is inclined downward toward its outer edge, and an outlet or spout N leads from one side of the receiver to discharge the milk and cream into a receptacle provided for that purpose. On the upper side of the receiver M, preferably at the center of it, a receptacle O is arranged to receive the supply of milk that is to be treated by the apparatus and into which the supply can be delivered either continuously or intermittently, as occasion requires. Said receptacle is provided with a discharge-pipe P, that leads into the receptacle F, from which the milk is conveyed into the apparatus in the manner hereinbefore described.

It will be seen that my apparatus is only provided with a single outlet, the duct L', by which the thoroughly-commingled milk and cream can escape from the bowls of the apparatus, and in this respect it differs materially from a cream-separator which is provided with separate and independent outlets, one for the cream and another for the skim-milk, and as a consequence no separation of the milk and cream can be effected by my apparatus; but by it the milk and cream become thoroughly commingled and the tangible impurities, including disease germs from the milk of infected cattle, will be cast out and lodged upon the walls and wings of the bowls H and J, from which they will be removed in the operation of cleansing the apparatus.

What I claim, and desire to secure by Letters Patent, is—

1. The herein-described process of clarifying milk consisting in first subjecting the milk within a closed vessel to a moderate centrifugal agitation sufficient to throw off the impurities but insufficient to entirely separate the milk from the cream, retaining the milk and cream together in the same vessel, and then recommingling the purified milk and cream by drawing them off together, substantially as described.

2. An apparatus for separating tangible impurities from milk, consisting of a revoluble shaft, D, an outer bowl, C, secured to and revolving with said shaft, an intermediate bowl, H, contained in said outer bowl and provided with wings, I, an inverted inner bowl, J, secured to a bonnet, E, that forms a closure for the top of the outer bowl, a receptacle, F, in the top of said bonnet, ducts, G, leading from said receptacle, and a duct, L', which forms an outlet for the commingled milk and cream; whereby the tangible impurities will be removed and the milk and cream be intimately commingled, as herein specified.

JEFFERSON L. BERGH.

Witnesses:
   WM. H. LOW,
   LEWIS BALCH.